United States Patent

Ashley et al.

[11] Patent Number: 5,946,354
[45] Date of Patent: Aug. 31, 1999

[54] HARD DISK DRIVE READ CHANNEL WITH HALF SPEED TIMING

[75] Inventors: Jonathan James Ashley, Los Gatos; Brian Harry Marcus, Los Altos; Constantin Michael Melas, Los Gatos, all of Calif.

[73] Assignee: International Business Machines Corporation, Armonk, N.Y.

[21] Appl. No.: 08/730,862

[22] Filed: Oct. 18, 1996

[51] Int. Cl.[6] .................................................. H04K 1/10
[52] U.S. Cl. .......................... 375/260; 375/354; 341/144; 341/155; 360/23; 360/40; 369/59; 395/555; 395/559
[58] Field of Search ..................... 375/260, 316, 375/290, 229, 344, 231, 230, 285, 232, 349, 354, 253; 370/477; 360/40, 46, 23, 39; 369/59; 341/59, 106, 144, 155; 395/555, 559

[56] References Cited

U.S. PATENT DOCUMENTS

| | | | |
|---|---|---|---|
| 3,573,622 | 4/1971 | Holzman et al. | 325/38 |
| 3,731,220 | 5/1973 | Besenfelder | 331/1 A |
| 3,795,765 | 3/1974 | DeGroat et al. | 178/6 |
| 4,271,525 | 6/1981 | Watanabe | 375/232 |
| 4,373,152 | 2/1983 | Jacobsthal | 340/347 |
| 4,398,225 | 8/1983 | Cornaby et al. | 360/39 |
| 4,413,251 | 11/1983 | Adler et al. | 340/347 |
| 4,488,142 | 12/1984 | Franaszek | 340/347 |
| 4,544,962 | 10/1985 | Kato et al. | 360/40 |
| 4,684,921 | 8/1987 | Fok et al. | 340/347 |
| 4,847,869 | 7/1989 | Labedz et al. | 375/349 |
| 4,860,286 | 8/1989 | Forsberg et al. | 370/106 |
| 4,870,415 | 9/1989 | Van Maren et al. | 341/94 |
| 4,897,854 | 1/1990 | Harris et al. | 375/17 |
| 5,047,767 | 9/1991 | Weathers et al. | 341/59 |
| 5,258,933 | 11/1993 | Johnson et al. | 364/602 |
| 5,396,239 | 3/1995 | McMahon et al. | 341/58 |
| 5,408,499 | 4/1995 | Sasaki | 375/286 |
| 5,521,767 | 5/1996 | Weng et al. | 360/46 |
| 5,731,768 | 3/1998 | Tsang | 341/59 |

Primary Examiner—Amanda T. Le
Attorney, Agent, or Firm—Morgan & Finnegan

[57] ABSTRACT

A hard disk drive read circuit for d=1 run length limited (RLL) encoded data which processes multiple consecutive data samples in parallel. The circuit of the present invention receives an analog signal from the read head of the hard disk drive. The circuit comprises a plurality of digital detection channels, coupled to the analog signal, each channel outputting an alternate bit of digital data represented by the analog signal. A timing circuit, coupled to the plurality of digital detection channels, generates a plurality of timing signals controlling the plurality of digital detection channels. The timing circuit derives timing information from one of the digital detection channels. The d=1 RLL code is modified so that there are at most nine consecutive 0's in the digital data output by the digital detection channel from which the timing circuit derives the timing information. An encoder generates the encoded digital data to be recorded on the hard disk drive.

19 Claims, 4 Drawing Sheets

HARD DISK DRIVE READ CHANNEL WITH HALF SPEED TIMING

FIELD OF THE INVENTION

The present invention relates to hard disk drive read circuitry and in particular to a hard disk drive read circuit for d=1 run length limited encoded data which processes multiple consecutive data samples in parallel.

BACKGROUND OF THE INVENTION

In digital CMOS circuits, power dissipation is proportional to clock frequency. If the clock frequency is reduced to reduce the power dissipation, the data throughput of the circuit is also reduced, unless data is processed in parallel by additional data processing channels. If, for example, the clock frequency is halved, the original throughput can be maintained if two consecutive data samples are processed in parallel. As long as the additional processing channel does not double the overall circuitry, overall power dissipation will be reduced, or a higher data throughput can be achieved for the same power dissipation.

Hard disk drive technology is one area where reduction of power dissipation is important. The read decoding circuitry of such hard drives operates at a very high frequency and is typically implemented with digital CMOS circuits. Reduction of the clock frequency of hard drive read decoding circuitry would provide a significant reduction in power dissipation.

SUMMARY OF THE INVENTION

The present invention is a hard disk drive read circuit for d=1 run length limited encoded data which processes multiple consecutive data samples in parallel. The circuit of the present invention receives an analog signal from the read head of the hard disk drive. The circuit comprises a plurality of digital detection channels, coupled to the analog signal, each channel outputting an alternate bit of digital data represented by the analog signal. A timing circuit, coupled to the plurality of digital detection channels, generates a plurality of timing signals controlling the plurality of digital detection channels. The timing circuit derives timing information from one of the digital detection channels.

In another aspect, the present invention is a d=1 RLL code modified so that there are at most nine consecutive 0's in the digital data output by the digital detection channel from which the timing circuit derives the timing information.

In another aspect, the present invention is an encoder which generates the encoded digital data to be recorded on the hard disk drive.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
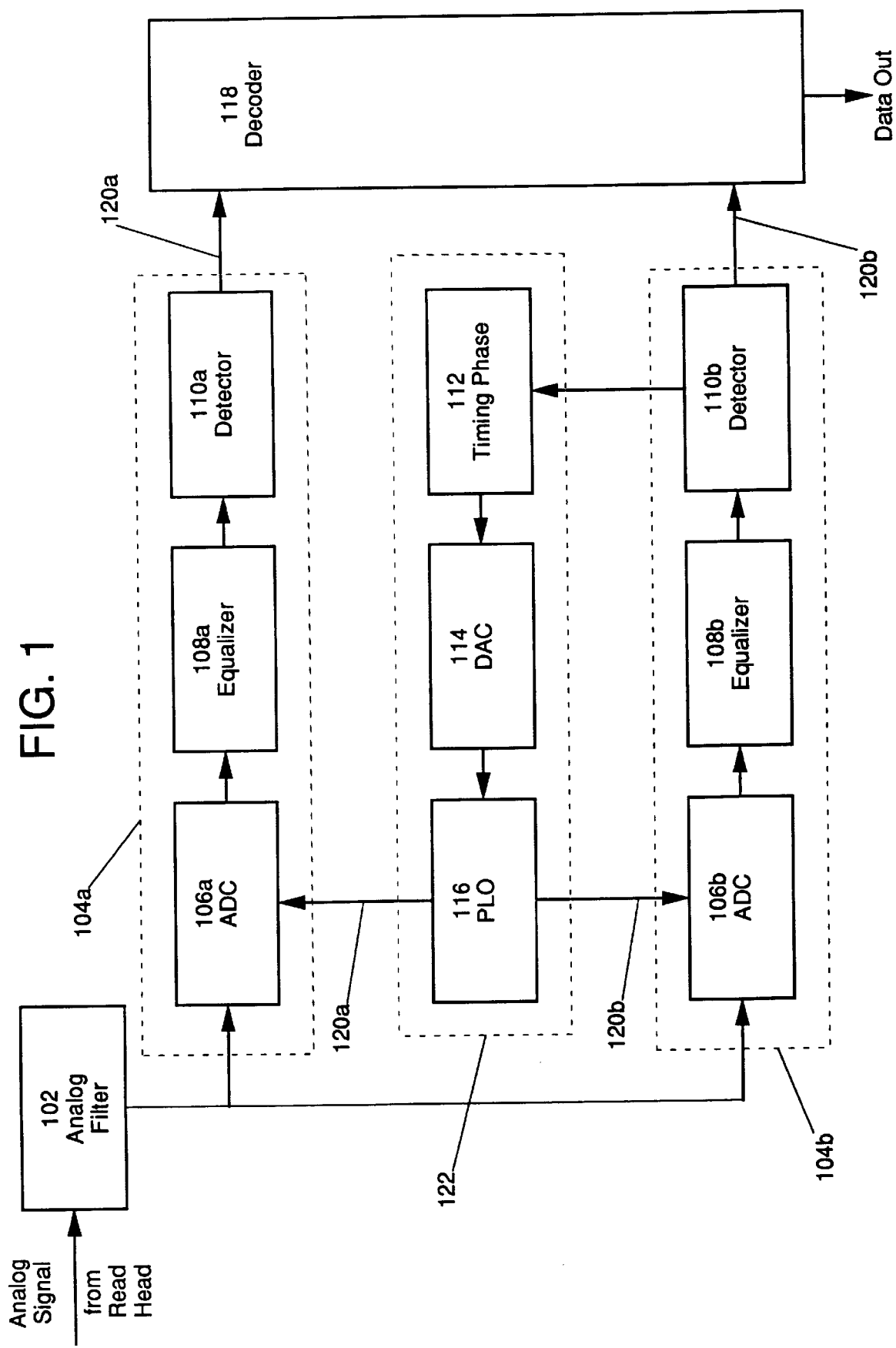
FIG. 1 is a block diagram of a hard disk drive read circuit with half-speed timing, in accordance with the present invention.

FIG. 1 is a block diagram of a hard disk drive read circuit with half-speed timing. The analog signal from the read head is filtered by analog filter 102. The filtered analog signal is then applied to both digital detection channels 104a and 104b. Each digital detection channel includes an analog to digital converter (ADC) 106a and 106b, an equalizer 108a and 108b and a detector 110a and 110b. ADCs 106a and 106b sample the analog read signal at timing intervals defined by sample clock signals 120a and 120b from phase lock oscillator (PLO) 116. Sample clock signals 120a and 120b are the same frequency, but alternate phases, so that alternate data bits are detected and output by each digital detection channel. Digital detection channel 104a outputs the odd data bits—bits 1, 3, 5, etc. Digital detection channel 104b output the even data bits—0, 2, 4, etc. The sampled read signal for digital detection channels 104a and 104b are equalized by equalizers 108a and 108b, respectively. The binary data is detected by the respective detector, 110a or 110b of each digital detection channel. The odd bit binary data output 120a and the even bit binary data output 120b are input to decoder 118, which generates the final output data from the read circuit.

Timing signals are derived by timing circuit 122 from only one digital detection channel, channel 104b. Digital timing phase signals are extracted from digital detection channel 104b by timing phase circuit 112. The digital signals are converted to analog by digital to analog converter (DAC) 114 and are applied to phase lock oscillator (PLO) 116. PLO 116 generates the sample clock signal for ADCs 106a and 106b. The timing phase signals close the loop and lock PLO 116 onto the actual frequency of the read signal.

In a preferred embodiment, a d=1 run length limited (RLL) code is used to encode the signal recorded on the hard drive. A d=1 RLL code has the sole constraint that 1's are isolated, there are not two or more consecutive 1's. However, there can be any number of consecutive 0's. Consecutive 0's have no transitions and so cannot carry timing information. A modified d=1 RLL code which contains adequate timing information must be used. In addition, because timing signals are extracted from only the even channel 104b, the signal recorded on the hard drive must be encoded so that all necessary timing information is carried by the even bits. Therefore, a modified d=1 RLL code must be used with a constraint on the number of consecutive 0's in the even sub-sequence. This constraint is represented by the quantity $k_{even}$.

In a preferred embodiment, a modified d=1 RLL code has $k_{even}=9$. This code is preferred because of its resulting encoding rate. The encoding rate of standard d=1 RLL is 2:3. This means that three bits of encoded data are generated for every two bits of unencoded data. A preferred code, having $k_{even}=9$, also has an encoding rate of 2:3.

Figure 2:
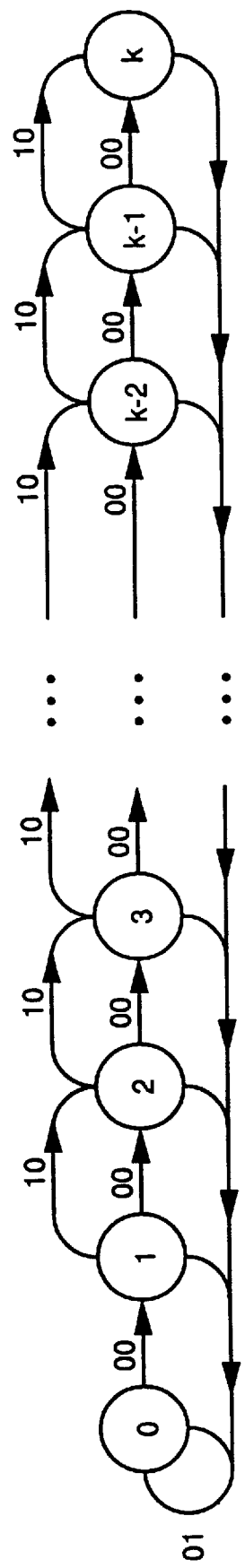
FIG. 2 is a finite state transition diagram of a d=1 RLL code, in accordance with the present invention.

FIG. 2 is a finite state transition diagram of a d=1 RLL code having a constraint $k=k_{even}$. The allowable constrained sequences are those which can be generated by this diagram. The states are represented by number enclosed by circles. Transitions from state to state are caused by presentation of pairs of bits in the datastream. Each pair of bits includes one odd bit and one even bit and is represented as OE, where O is the odd bit and E is the even bit. Pairs of bits must be used to cause state transitions because the $k_{even}$ constraint is only on the even bits. The sequence begins in state 0. Presentation of a 01 causes the sequence to remain in state 0. Presentation of 00 causes the sequence to transition to state 1. There are no transitions from state 0 due to presentation of 10 or 11 because those bit pairs are not allowed after a 01, due to the constraint that there cannot be consecutive 1's. In states 1 through k−1, presentation of a 00 or 10 causes the sequence to transition to the next state. Presentation of a 01 causes a transition back to state 0. Again, there are no transitions for 11 due to the constraint on consecutive 1's. State k is reached only after the number of even bit 0's equals the value k. The only allowed transition from state k is 01, which returns the sequence to state 0.

Figure 3:
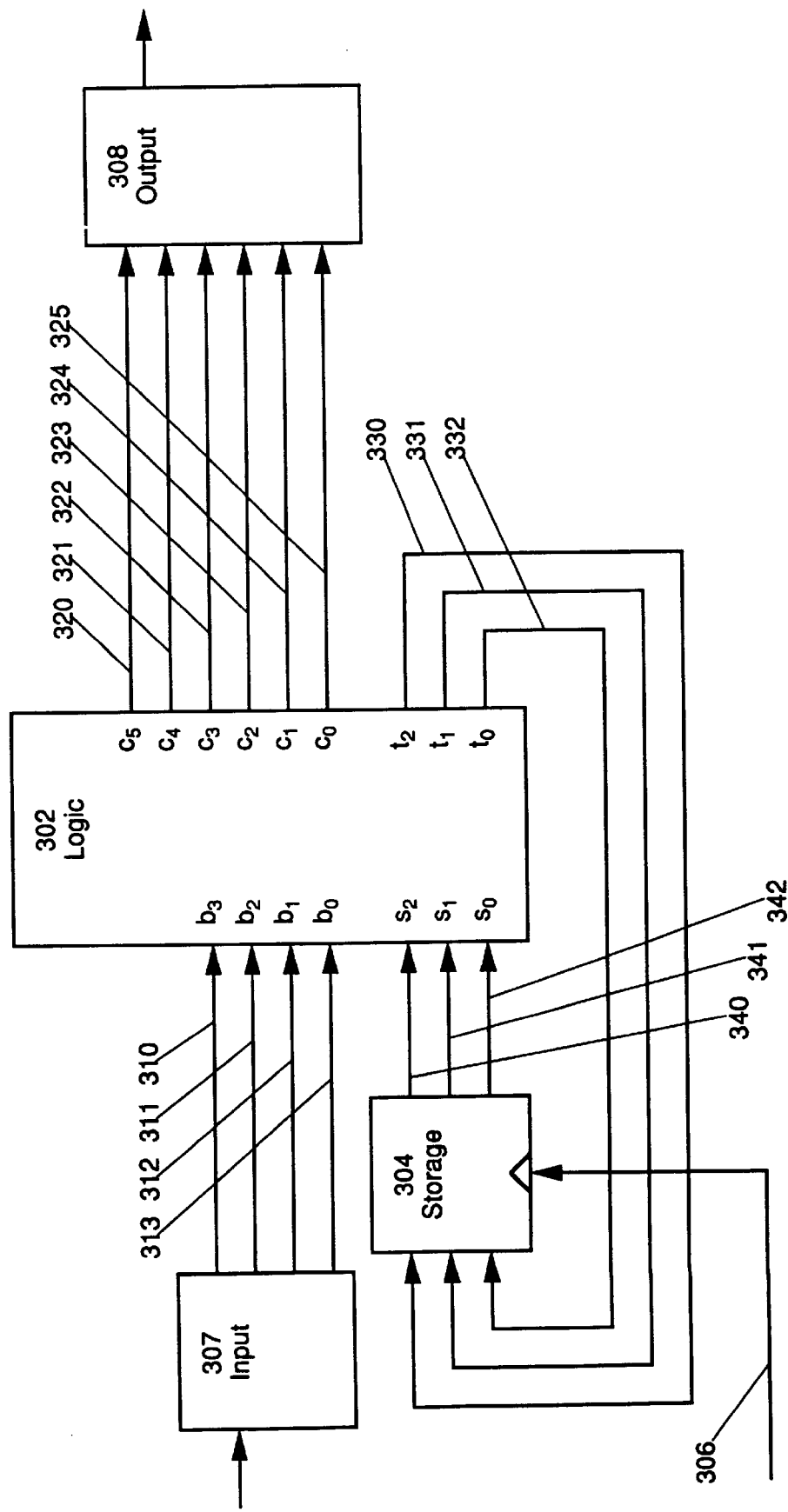
FIG. 3 is a block diagram of an encoder 300, in accordance with the present invention, which generates a datastream encoded with the code of FIG. 2.

FIG. 3 is a block diagram of an encoder 300, which generates a datastream encoded with a modified d=1 code meeting the above described constraints. Encoder 300 is preferably a finite state machine, but software implementation is also possible. Encoder 300 includes input block 307, logic block 302, storage block 304 and output block 308. Encoder 300 outputs 6 encoded bits for every 4 bits input. Input block 307 receives unencoded data and transmits it to inputs $b_3$–$b_0$ of logic block 302 via lines 310–13. Encoded data is output from logic block 302 via outputs $c_5$–$c_0$ over lines 320–25 to output block 308, which outputs the encoded data. Next state information is output from logic block 302 via outputs $t_2$–$t_0$ 330–32. The next state is stored in storage register 304 as controlled by storage clock 306. Once stored, the next state becomes the present state and is input to logic block 302 via inputs $s_2$–$s_0$ 340–42. The logic included in logic block 302 is shown in Table A. In order to reduce the gate count, intermediate products, which are only used internally, are generated.

TABLE A

| | Encoder Output |
|---|---|
| present state | $c_5\ c_4\ c_3\ c_2\ c_1\ c_0$ |
| user byte | $d_5\ d_4\ d_3\ d_2\ d_1\ d_0$ |
| intermediate products | |
| $x_0$ | $s_1 s_0$ |
| $x_1$ | $\overline{b_2 b_1} + b_0$ |
| $x_1$ | $\overline{c_0} + \overline{b_3}$ |
| output | |
| $c_5$ | $\overline{s_1} s_0 b_1 \overline{c_2} + \overline{b_1} b_0 c_0 + b_2 b_0 c_0 + x_0 \underline{x_2} + s_1 c_2$ |
| $c_4$ | $\overline{s_2 c_2 x_0} x_2 + \overline{s_1} b_3 c_2$ |
| $c_3$ | $\overline{b_2 b_1} c_5 x_0 + \overline{c_5} c_0 x_1 + \overline{b_3} c_5 c_0 + s_2 \underline{x_2}$ |
| $c_2$ | $\overline{s_2 c_0 \underline{x_0}} + \overline{s_2 s_1 s_0} + s_0 \overline{x_2}$ |
| $c_1$ | $\overline{b_3 c_4 c_2} + \overline{s_2 b_0}$ |
| $c_0$ | $\overline{s_2 b_3 x_0} + \overline{s_2 x_1}$ |
| Encoder Next State | |
| intermediate products | |
| $y_0$ | $\overline{b_3} + s_0$ |
| $y_1$ | $\overline{s_1 b_1} + \overline{s_1 b_1}$ |
| $y_2$ | $y_0 + \overline{s_1}$ |
| $y_3$ | $b_2 t_2$ |
| next state | |
| $t_2$ | $\overline{s_2 b_2 b_1 \overline{y_2}} + \overline{s_2 b_1 b_0 y_2} + s_2 s_0 b_2 y_2 + \overline{s_2 s_0 b_2 y_1} + \overline{s_2 b_2 b_1 b_0}$ |
| $t_1$ | $\overline{s_2 b_2 b_0 y_2} + s_2 s_0 t_2 y_1 + b_1 y_3 + s_1 y_3$ |
| $t_0$ | $\overline{b_1 b_0 t_1 y_2} + \overline{s_2 b_1 t_2} + \overline{y_2} y_3 + s_2 y_3 + s_2 t_1$ |

The resulting code is shown in Table B. The rows are indexed by the states, 0 to 6. The columns are indexed by the inputs, which are 4-bit binary strings written in decimal. The entries are of the form c|s, where c is the decimal representation of the 6-bit output string and s is the next state.

TABLE B

| | 0 | 1 | 2 | 3 | 4 | 5 | 6 | 7 |
|---|---|---|---|---|---|---|---|---|
| 0 | 17/0 | 16/1 | 17/1 | 16/2 | 17/2 | 16/3 | 16/4 | 16/5 |
| 1 | 5/0 | 4/1 | 5/1 | 4/2 | 5/2 | 4/3 | 4/4 | 4/5 |
| 2 | 0/1 | 2/1 | 0/3 | 2/3 | 0/4 | 2/4 | 0/6 | 2/6 |
| 3 | 41/0 | 36/1 | 41/1 | 36/2 | 41/2 | 36/3 | 36/4 | 36/5 |
| 4 | 17/0 | 16/1 | 17/1 | 16/2 | 17/2 | 16/3 | 16/4 | 16/5 |
| 5 | 32/3 | 34/3 | 32/1 | 34/1 | 32/6 | 34/6 | 32/4 | 34/4 |
| 6 | 0/1 | 2/1 | 32/1 | 34/1 | 0/4 | 2/4 | 32/4 | 34/4 |

| | 8 | 9 | 10 | 11 | 12 | 13 | 14 | 15 |
|---|---|---|---|---|---|---|---|---|
| 0 | 1/0 | 18/1 | 1/1 | 18/2 | 1/2 | 18/3 | 18/4 | 18/5 |
| 1 | 21/0 | 20/1 | 21/1 | 20/2 | 21/2 | 20/3 | 20/4 | 20/5 |
| 2 | 8/1 | 10/1 | 8/3 | 10/3 | 8/4 | 10/4 | 8/6 | 10/6 |
| 3 | 9/0 | 33/0 | 1/1 | 9/1 | 1/2 | 33/1 | 9/2 | 33/2 |
| 4 | 37/0 | 18/1 | 37/1 | 18/2 | 37/2 | 18/3 | 18/4 | 18/5 |
| 5 | 40/3 | 42/3 | 40/1 | 42/1 | 40/6 | 42/6 | 40/4 | 42/4 |
| 6 | 8/1 | 10/1 | 40/1 | 42/1 | 8/4 | 10/4 | 40/4 | 42/4 |

Figure 4:
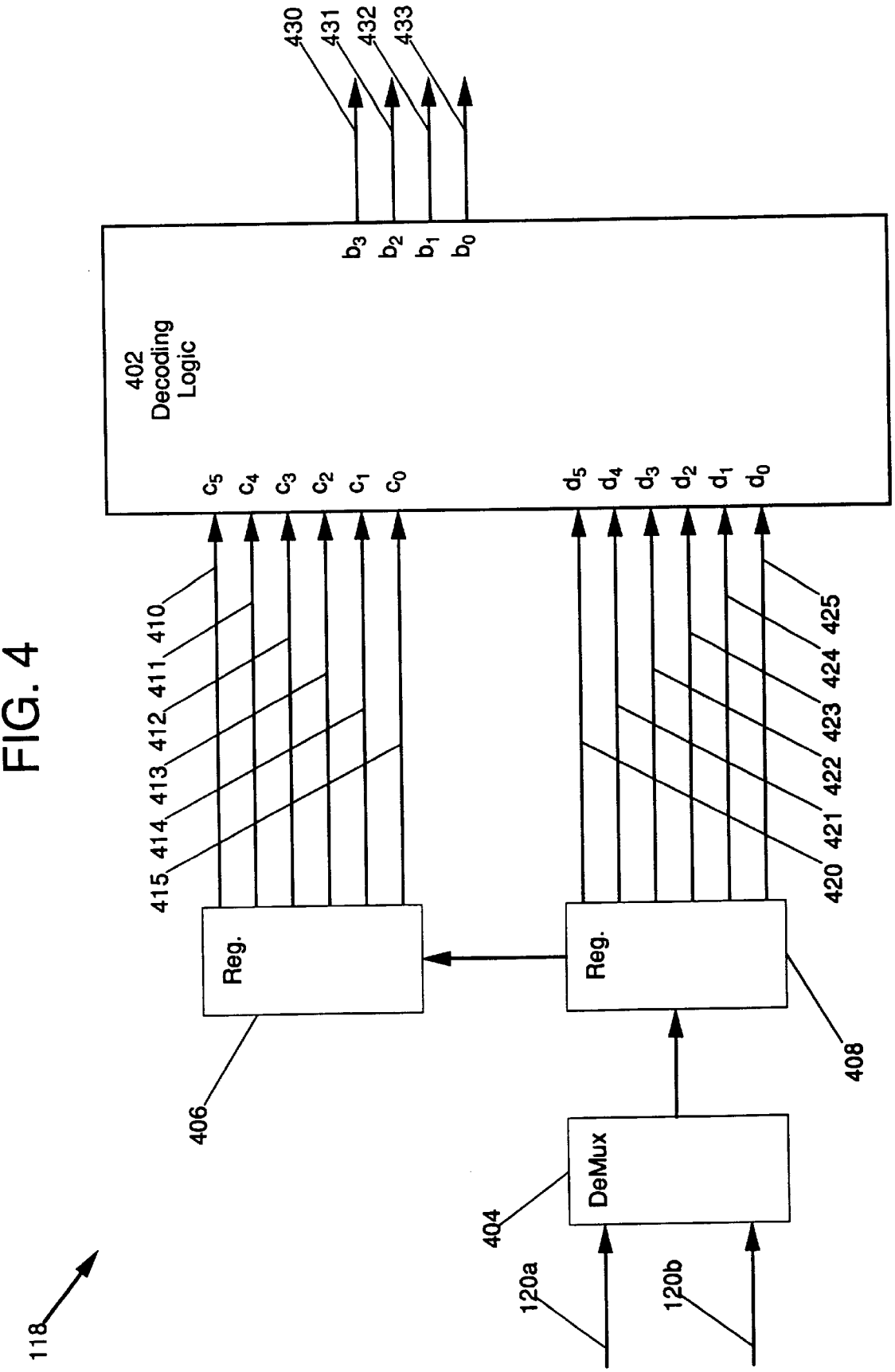
FIG. 4 is a block diagram of a decoder 118 of FIG. 1, in accordance with the present invention, which decodes a datastream encoded with the code of FIG. 2.

FIG. 4 is a block diagram of a decoder 118 of FIG. 1, which decodes a datastream encoded with the modified d=1 code of Table B. The odd bit binary data output 120*a* and the even bit binary data output 120*b* are input to demultiplexer 404. Demultiplexer 404 demultiplexes the separate odd and even bits into integrated six-bit strings and outputs the six-bit strings to storage register 408. Two storage registers are needed because two six-bit strings are used to generate each four-bit output nibble. Register 406 stores the six-bit string currently being decoded. Register 408 stores the six-bit string to be decoded next. The six bit outputs from register 406, outputs 410 to 415, are input to decoding logic block 402, on inputs $c_5$ to $c_0$. The six bit outputs from register 408, outputs 420 to 425, are input to decoding logic block 402 on inputs $d_5$ to $d_0$. Decoded four-bit groups are output from outputs $b_3$ to $b_0$ 430 to 433. After each four-bit group is output, the six-bit string stored in register 408 replaces the string stored in register 406 and a new string is stored in register 408.

The logic included in decoding logic block 402 is shown in Table C. In order to reduce the gate count, intermediate products, which are only used internally, are generated.

TABLE C

| | Decoder |
|---|---|
| present state | $c_5\ c_4\ c_3\ c_2\ c_1\ c_0$ |
| user byte | $d_5\ d_4\ d_3\ d_2\ d_1\ d_0$ |
| intermediate products | |
| $z_0$ | $c_2 + c_4$ |
| $z_1$ | $\overline{c_3 c_1}$ |
| $z_2$ | $\overline{d_2 d_0}$ |
| $z_3$ | $\overline{d_4 d_0} + \overline{d_5} d_2$ |
| $z_4$ | $\overline{c_0 d_4}$ |
| $z_5$ | $\overline{d_5 z_1}$ |
| $z_6$ | $\overline{d_4 z_2}$ |
| $z_7$ | $\overline{c_0 d_2}$ |
| $z_8$ | $\overline{c_3 c_2}$ |
| $z_9$ | $\overline{d_5 z_0}$ |
| user byte | |
| $b_3$ | $\overline{c_5 c_0 z_9} + c_5 c_0 z_5 + c_1 c_4 + c_2 c_4 + c_3 \overline{c_0}$ |
| $b_2$ | $\overline{d_2 z_0 z_2} z_4 + b_0 z_7 z_8 + c_0 d_2 z_4 + d_5 d_2 d_0 + z_0 z_6 + \overline{b_0} z_6 + d_5 z_0$ |
| $b_1$ | $\overline{c_5 b_2 z_0 z_6 z_7} + \overline{c_5 d_2 b_2} z_9 + \overline{c_5 d_2 z_0} z_4 + \overline{c_5 z_5 z_6} + \overline{c_1 b_0 z_6} + \overline{c_0 b_0 z_0} + \overline{c_5 d_5 b_2} + \overline{b_2 z_7}$ |

TABLE C-continued

| | |
|---|---|
| $b_0$ | $c_5b_3z_8 + c_3b_3z_7 + \overline{d_2z_0z_4} + \overline{c_0z_0z_3} + c_1\overline{c_4}$ |

The resulting decoding is shown in Table D. Each row corresponds to the current 6-bit string, which is stored in register 406, written in decimal. Each column corresponds to the next 6-bit string, which is stored in register 408, written in decimal. The table entries are the 4-bit output groups, written decimal. As can be seen, some combinations cannot occur and are designated by a "-".

TABLE D

| | c inputs | | | | |
|---|---|---|---|---|---|
| d inputs | 0,2,8,10 | 1,9,33,36,41 | 4,5,20,21 | 16,17,18,37 | 32,34,40,42 |
| 0 | 6 | 2 | 0 | 4 | 6 |
| 1,21,37 | 12 | 8 | 10 | 8 | — |
| 2 | 7 | 3 | 1 | 5 | 7 |
| 4,16,36 | 3 | 5 | 1 | 6 | 7 |
| 5,17,41 | 4 | 0 | 2 | 0 | — |
| 8 | 14 | 10 | 8 | 12 | 14 |
| 9 | 14 | 8 | 11 | 8 | — |
| 10 | 15 | 11 | 9 | 13 | 15 |
| 18,20 | 11 | 13 | 9 | 14 | 15 |
| 32 | 4 | 0 | 2 | 6 | 4 |
| 33 | 15 | 9 | 13 | 9 | — |
| 34 | 5 | 1 | 3 | 7 | 5 |
| 40 | 12 | 8 | 10 | 14 | 12 |
| 42 | 13 | 9 | 11 | 15 | 13 |

Although specific embodiments of the present invention have been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A circuit for generating digital data signals from an analog signal representing digital data, comprising:
   a plurality of digital detection channels, coupled to the analog signal, each channel outputting an alternate bit of digital data represented by the analog signal; and
   a timing circuit, coupled to the plurality of digital detection channels, generating a plurality of timing signals controlling the plurality of digital detection channels, the timing circuit deriving timing information from a single one of the plurality of digital detection channels.

2. The circuit of claim 1, wherein each one of the plurality of digital detection channels comprises:
   an analog to digital converter, coupled to the analog signal, generating a digital signal representing the analog signal;
   an equalizer, coupled to the digital signal, generating an equalized digital signal; and
   a detector, coupled to the equalized digital signal, generating a binary data signal.

3. The circuit of claim 1, wherein the timing circuit comprises:
   a timing phase circuit, coupled to one of the plurality of digital detection channels, extracting a timing phase signal from the digital detection channel;
   a digital to analog converter, coupled to the timing phase signal, generating an error signal; and
   a phase locked oscillator, coupled to the error signal, generating a plurality of timing signals, each timing signal controlling a respective one of the plurality of digital detection channels.

4. The circuit of claim 1, wherein:
   each one of the plurality of digital detection channels comprises:
      an analog to digital converter, coupled to the analog signal and having a timing signal input, generating a digital signal representing the analog signal,
      an equalizer, coupled to the digital signal, generating an equalized digital signal, and
      a detector, coupled to the equalized digital signal, generating a binary data signal; and
   the timing circuit comprises:
      a timing phase circuit, coupled to one of the plurality of digital detection channels, extracting a timing phase signal from the digital detection channel,
      a digital to analog converter, coupled to the timing phase signal, generating an error signal, and
      a phase locked oscillator, coupled to the error signal, generating a plurality of timing signals, each timing signal coupled to a timing signal input of the analog to digital converter of a respective one of the plurality of digital detection channels.

5. The circuit of claim 1, wherein there are two digital detection channels.

6. The circuit of claim 1, wherein the digital data represented by the analog signal is encoded with a run length limited code having at most nine consecutive 0's in the digital data output by the digital detection channel from which the timing circuit derives the timing information, the circuit further comprising:
   a decoder, coupled to the outputs of the plurality of digital detection channels, decoding the encoded digital data.

7. The circuit of claim 6, wherein the decoder comprises:
   a demultiplexer, coupled to the output of each digital detection channel, arranging each alternate bit to form a multi-bit string and outputting the multi-bit string;
   a first register, coupled to the demultiplexer, storing a first multi-bit string;
   a second register, coupled to the demultiplexer, storing a second multi-bit string;
   a decoding logic circuit, coupled to the first register and the second register, outputting a multi-bit group based on the first multi-bit string and on the second multi-bit string.

8. A system including a circuit for generating digital data signals from an analog signal representing digital data, according to claim 1, and a circuit which accepts a digital data signal and outputs an analog signal representing the digital data, comprising:
   an input device receiving the digital data signal;
   a finite state machine, coupled to the digital data signal and generating a signal encoded with a run length limited code having at most nine consecutive 0's; and
   an output device, coupled to the encoded signal, outputting the encoded signal.

9. In a circuit for generating digital data signals from an analog signal representing digital data, comprising a plurality of digital detection channels, each channel outputting an alternate bit of encoded digital data represented by the analog signal, and a timing circuit generating a plurality of timing signals controlling the plurality of digital detection channels, the timing circuit deriving timing information from a single one of the plurality of digital detection channels, a decoder for decoding the encoded digital data comprising:

a demultiplexer, coupled to the output of each digital detection channel, arranging each alternate bit to form a multi-bit string and outputting the multi-bit string;

a first register, coupled to the demultiplexer, storing a first multi-bit string;

a second register, coupled to the demultiplexer, storing a second multi-bit string;

a decoding logic circuit, coupled to the first register and the second register, outputting a multi-bit group based on the first multi-bit string and on the second multi-bit string.

10. The decoder of claim 9, wherein the digital data is encoded with a run length limited code having at most nine consecutive 0's in the digital data output by the digital detection channel from which the timing circuit derives the timing information.

11. In a circuit which accepts a digital data signal and outputs an analog signal representing the digital data, an encoder for encoding the digital data signal comprising:

an input device receiving the digital data signal;

a finite state machine, coupled to the digital data signal and generating a signal encoded with a run length limited code and having timing information encoded only on alternate bits of the encoded signal; and an output device, coupled to the encoded signal, outputting the encoded signal.

12. The circuit of claim 11, wherein the bits of the encoded signal which have timing information have at most nine consecutive 0's.

13. A system comprising:

a circuit which accepts a digital data signal and outputs an analog signal representing the digital data, comprising:

an encoder for encoding the digital data signal, comprising:

an input device receiving the digital data signal, a finite state machine, coupled to the digital data signal and generating a signal encoded with a run length limited code having at most nine consecutive 0's, and an output device, coupled to the encoded signal, outputting the encoded signal; and a circuit for generating digital data signals from an analog signal representing digital data, comprising:

a plurality of digital detection channels, coupled to the analog signal, each channel outputting an alternate bit of digital data represented by the analog signal, and a timing circuit, coupled to the plurality of digital detection channels, generating a plurality of timing signals controlling the plurality of digital detection channels, the timing circuit deriving timing information from a single one of the plurality of digital detection channels.

14. The circuit of claim 13, wherein each one of the plurality of digital detection channels comprises:

an analog to digital converter, coupled to the analog signal, generating a digital signal representing the analog signal;

an equalizer, coupled to the digital signal, generating an equalized digital signal; and a detector, coupled to the equalized digital signal, generating a binary data signal.

15. The circuit of claim 13, wherein the timing circuit comprises:

a timing phase circuit, coupled to one of the plurality of digital detection channels, extracting a timing phase signal from the digital detection channel;

a digital to analog converter, coupled to the timing phase signal, generating an error signal; and a phase locked oscillator, coupled to the error signal, generating a plurality of timing signals, each timing signal controlling a respective one of the plurality of digital detection channels.

16. The circuit of claim 13, wherein:

each one of the plurality of digital detection channels comprises:

an analog to digital converter, coupled to the analog signal and having a timing signal input, generating a digital signal representing the analog signal, an equalizer, coupled to the digital signal, generating an equalized digital signal, and a detector, coupled to the equalized digital signal, generating a binary data signal; and the timing circuit comprises:

a timing phase circuit, coupled to one of the plurality of digital detection channels, extracting a timing phase signal from the digital detection channel, a digital to analog converter, coupled to the timing phase signal, generating an error signal, and a phase locked oscillator, coupled to the error signal, generating a plurality of timing signals, each timing signal coupled to a timing signal input of the analog to digital converter of a respective one of the plurality of digital detection channels.

17. The circuit of claim 13, wherein there are two digital detection channels.

18. The circuit of claim 13, wherein the digital data represented by the analog signal is encoded with a run length limited code having at most nine consecutive 0's in the digital data output by the digital detection channel from which the timing circuit derives the timing information, the circuit further comprising:

a decoder, coupled to the outputs of the plurality of digital detection channels, decoding the encoded digital data.

19. The circuit of claim 18, wherein the decoder comprises:

a demultiplexer, coupled to the output of each digital detection channel, arranging each alternate bit to form a multi-bit string and outputting the multi-bit string;

a first register, coupled to the demultiplexer, storing a first multi-bit string;

a second register, coupled to the demultiplexer, storing a second multi-bit string;

a decoding logic circuit, coupled to the first register and the second register, outputting a multi-bit group based on the first multi-bit string and on the second multi-bit string.

* * * * *